United States Patent
Magness

(10) Patent No.: US 7,188,843 B2
(45) Date of Patent: Mar. 13, 2007

(54) MULTIUSE LIFTING AND ROLLING PLATFORM

(76) Inventor: Annop Magness, P.O. Box 1997, Rosemead, CA (US) 91770

( * ) Notice: Subject to any disclaimer, the term of this patent is extended or adjusted under 35 U.S.C. 154(b) by 802 days.

(21) Appl. No.: 09/942,855

(22) Filed: Aug. 29, 2001

(65) Prior Publication Data

US 2002/0125662 A1 Sep. 12, 2002

Related U.S. Application Data

(60) Provisional application No. 60/228,577, filed on Aug. 29, 2000.

(51) Int. Cl.
*B62B 3/02* (2006.01)

(52) U.S. Cl. ............... 280/30; 280/47.18; 280/32.6; 280/648

(58) Field of Classification Search ............ 280/641, 280/30, 47.18, 47.19, 47.29, 649, 654, 652, 280/47.24, 32.6, 648, 651, 47.34, 35
See application file for complete search history.

(56) References Cited

U.S. PATENT DOCUMENTS

| | | | | |
|---|---|---|---|---|
| 1,203,194 A | * | 10/1916 | Haege | 280/641 |
| 1,894,489 A | * | 1/1933 | Hirose et al. | 182/23 |
| 3,064,989 A | * | 11/1962 | Bellows | 280/641 |
| 3,276,542 A | * | 10/1966 | Pommier | 182/16 |
| 3,282,566 A | * | 11/1966 | Clarke | 254/122 |
| 3,498,628 A | * | 3/1970 | Ferneau et al. | 280/641 |
| 3,637,232 A | * | 1/1972 | Bourgraf et al. | 280/641 |
| 3,733,623 A | * | 5/1973 | Croxton | 5/611 |
| 3,751,058 A | * | 8/1973 | Larsen | 280/30 |
| 4,258,826 A | * | 3/1981 | Murray | 182/20 |
| 4,336,921 A | * | 6/1982 | Wienhold | 254/8 B |
| 4,403,680 A | * | 9/1983 | Hillesheimer | 177/146 |
| 4,488,326 A | * | 12/1984 | Cherry | 14/72.5 |
| 4,534,544 A | * | 8/1985 | Heide | 254/9 C |
| 4,690,248 A | * | 9/1987 | Killeen | 182/118 |
| 4,934,718 A | * | 6/1990 | Voegele | 280/30 |
| 5,033,584 A | * | 7/1991 | Battle | 182/168 |
| 5,156,238 A | * | 10/1992 | Matthews | 187/243 |
| 5,400,720 A | * | 3/1995 | Stevens | 108/147 |
| 5,829,948 A | * | 11/1998 | Becklund | 414/607 |
| 6,095,532 A | * | 8/2000 | Martin | 280/32.6 |
| 6,152,462 A | * | 11/2000 | Barrett | 280/30 |
| 6,173,811 B1 | * | 1/2001 | Tornabene et al. | 182/20 |
| 6,189,653 B1 | * | 2/2001 | Laug | 182/152 |
| RE37,372 E | * | 9/2001 | Smith | 280/32.6 |
| 6,471,236 B1 | * | 10/2002 | Eskridge | 280/648 |

* cited by examiner

*Primary Examiner*—Brian L. Johnson
*Assistant Examiner*—Bridget Avery

(57) ABSTRACT

A combination lift table, platform, tilt back hand truck, scaffold, work bucket, floor jack and mechanic' creeper. The combination is a portable and foldable unit that converts into a tilt back hand truck having two wheels or six wheels that have a lift table with extensible legs, an extensible device, a platform having flexible combination support plate, and an approach ramp. This combination also provides coupling device such as a pocket and bracket, which can be coupled to a plurality of space attachments for multiple purposes such as a scaffold, a work bucket, a floor jack, or a mechanic' creeper.

29 Claims, 10 Drawing Sheets

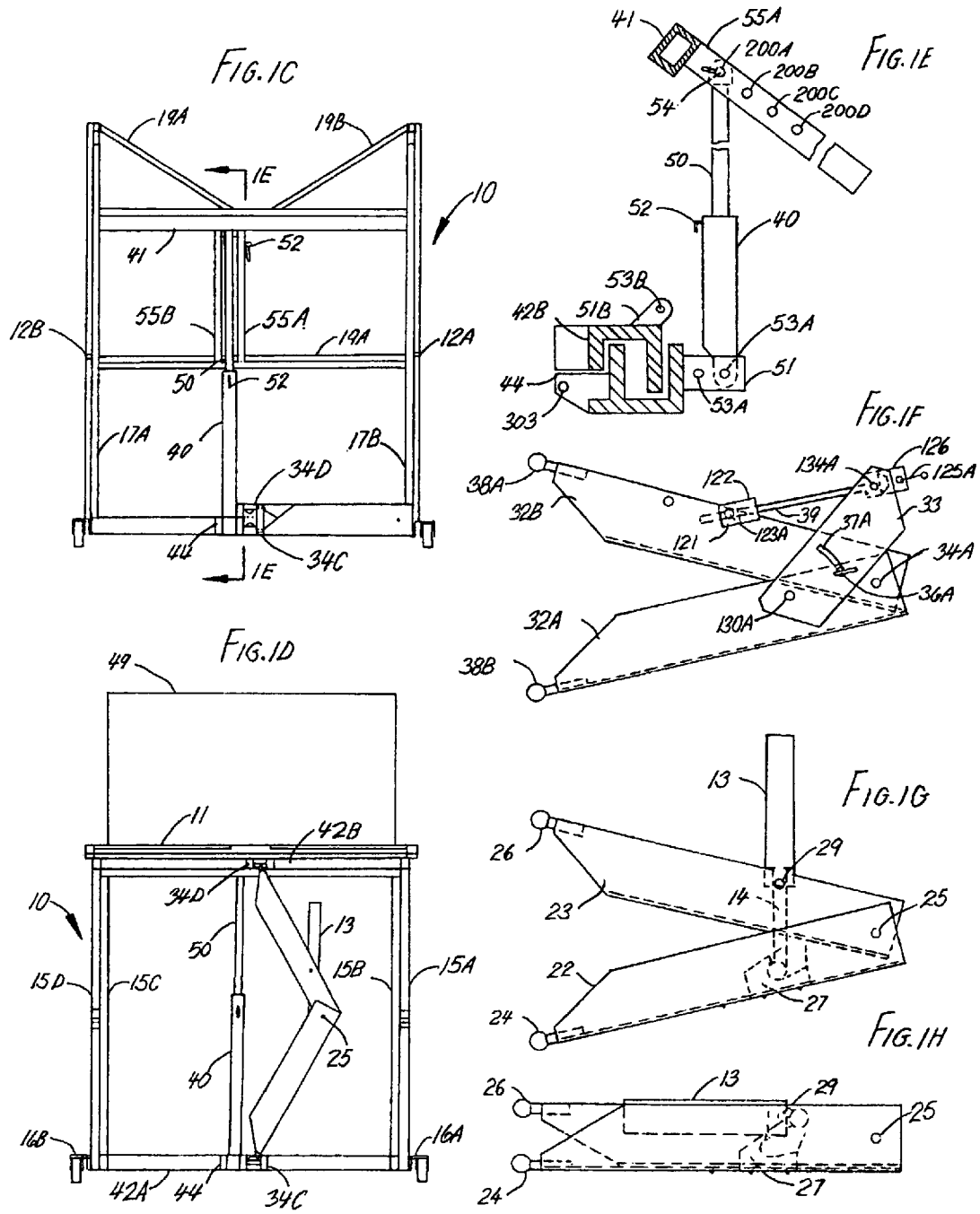

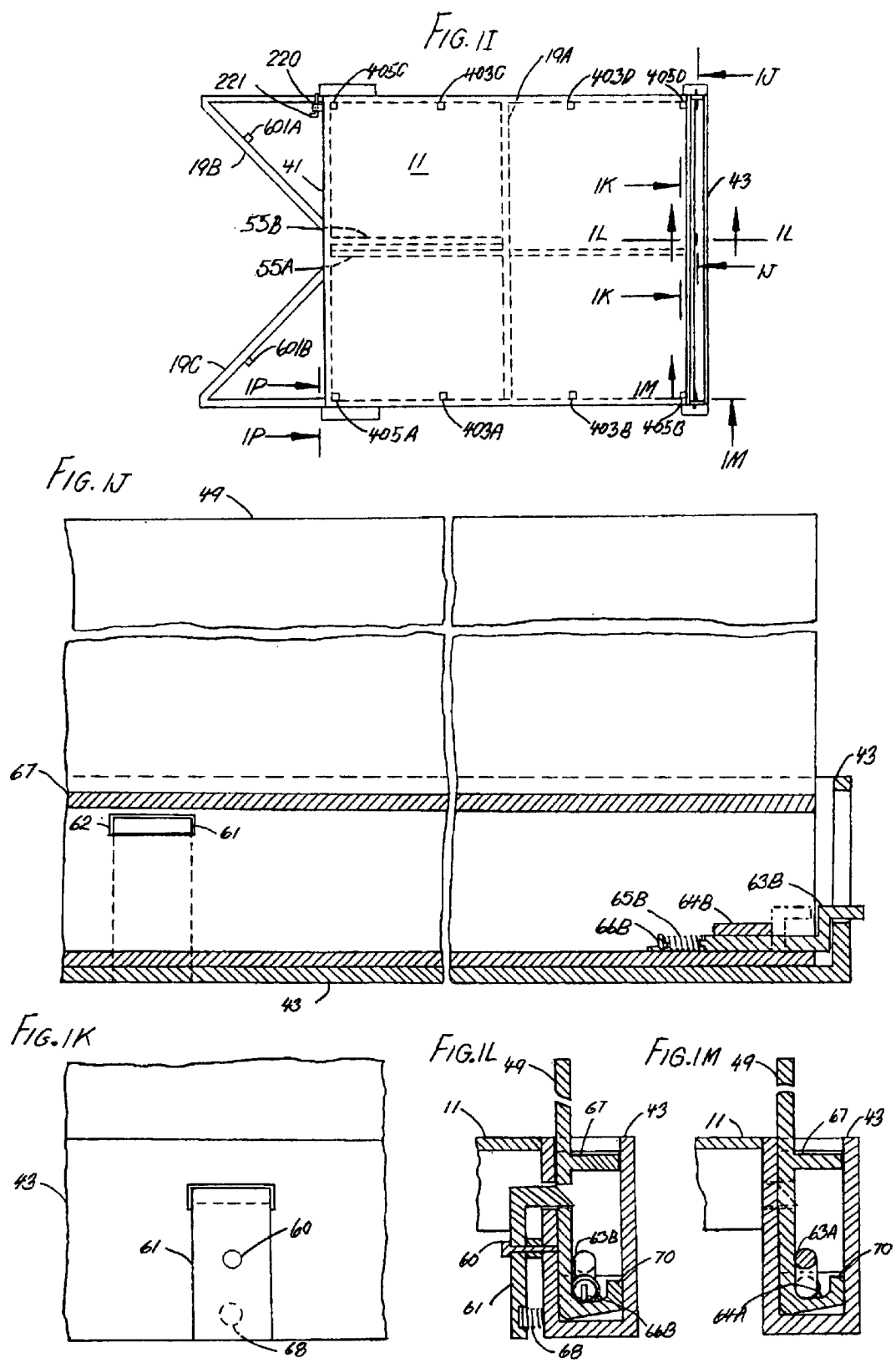

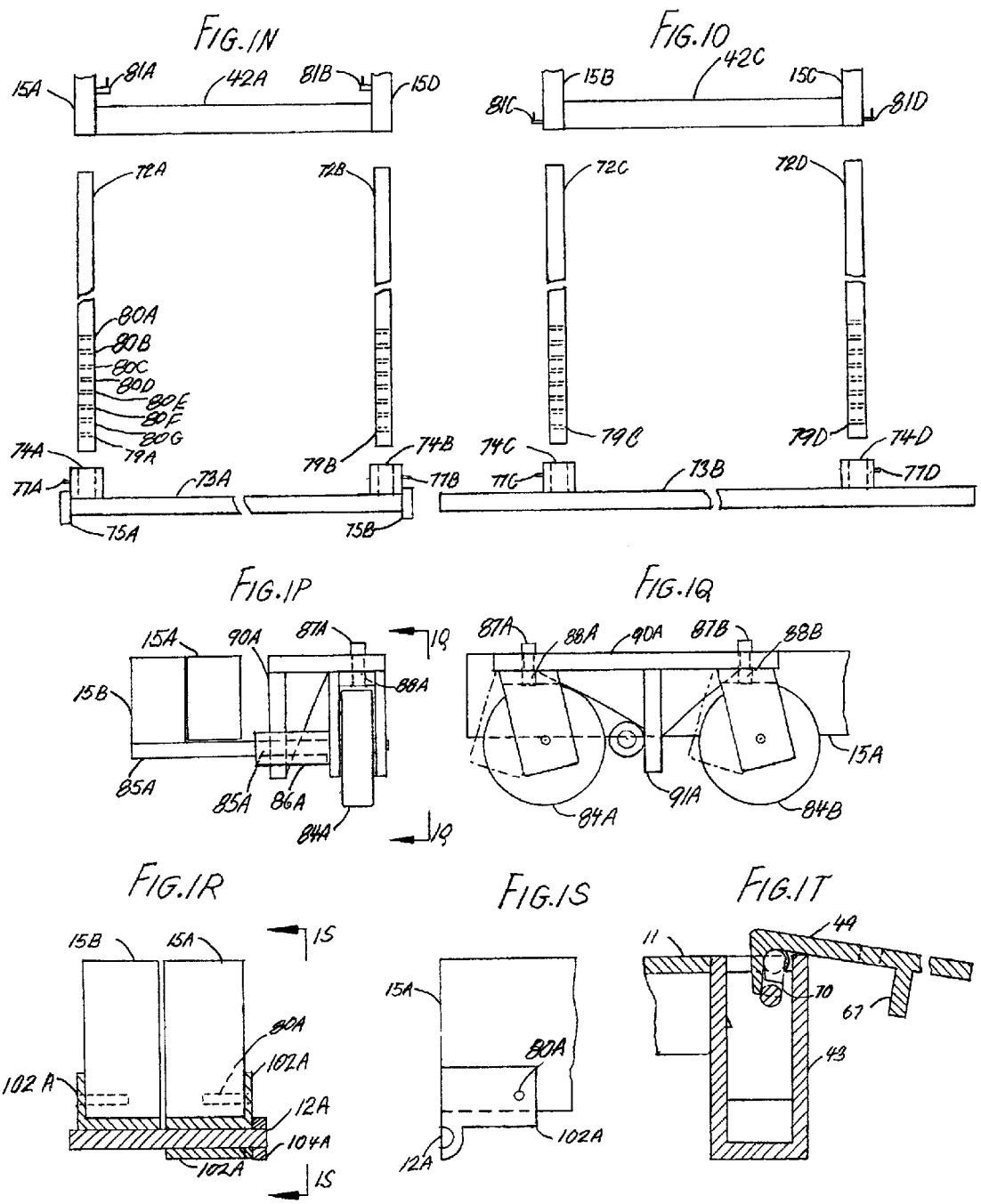

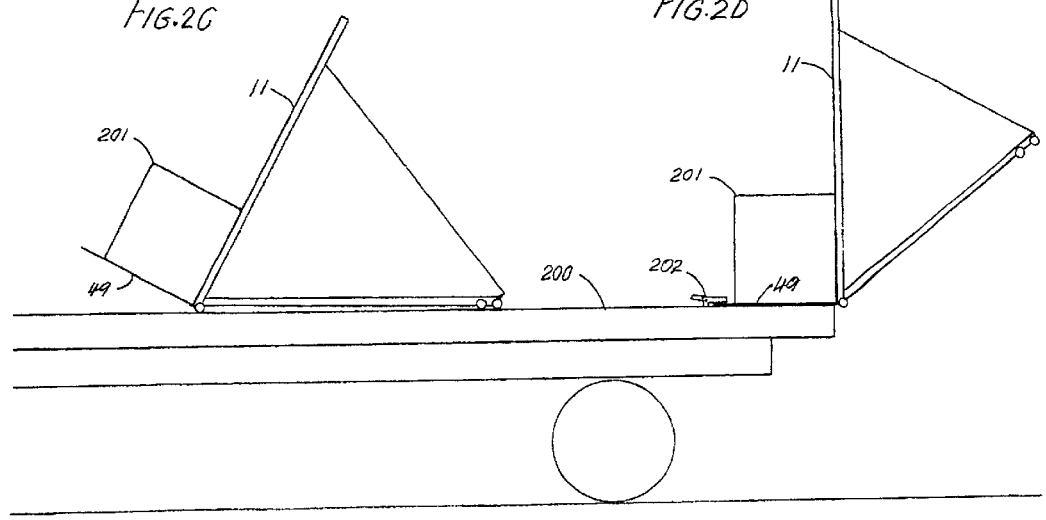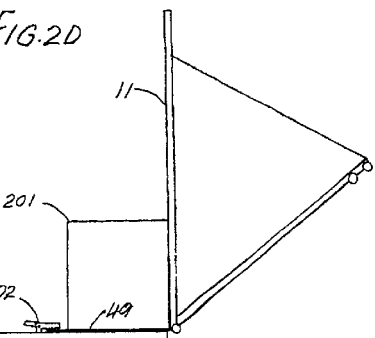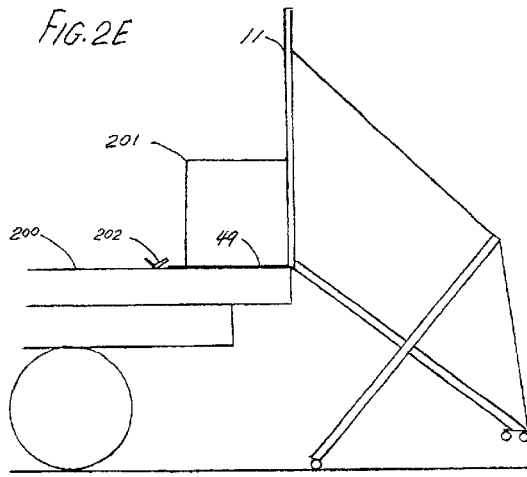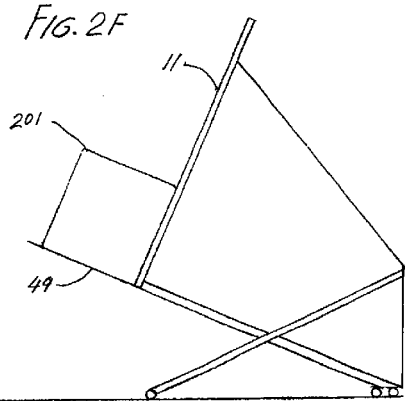

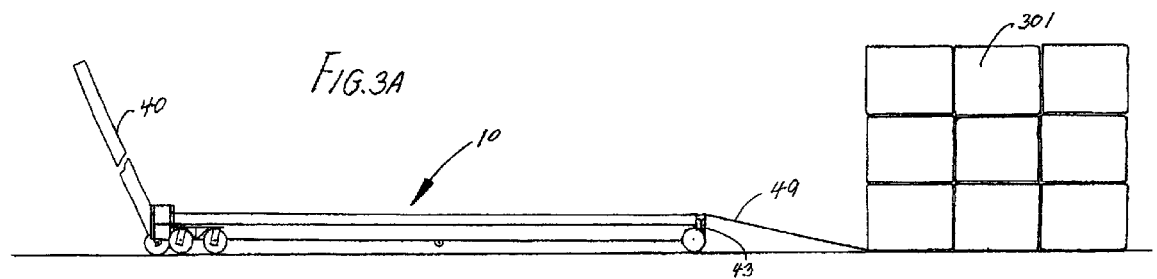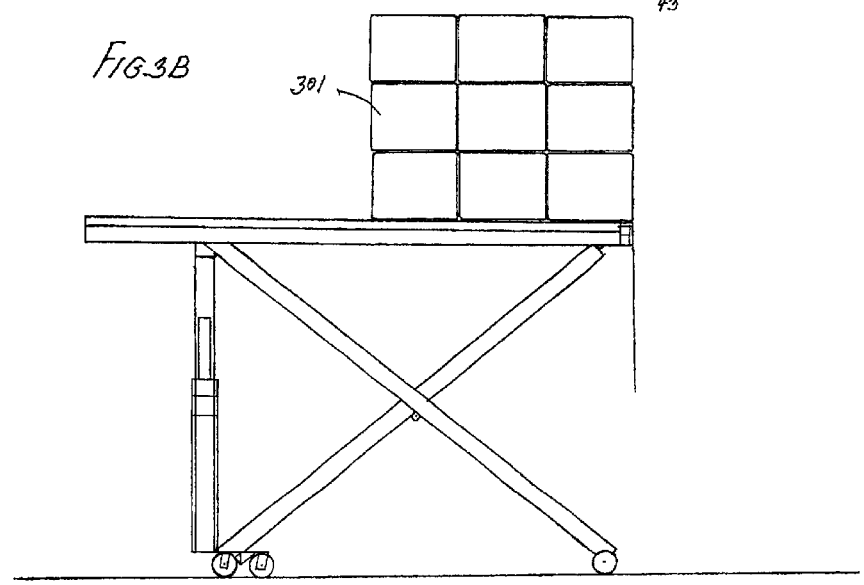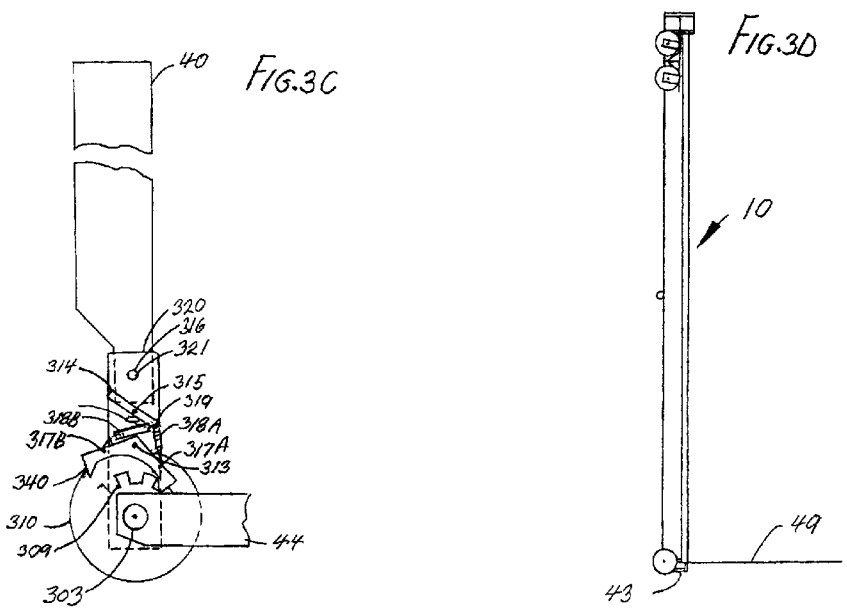

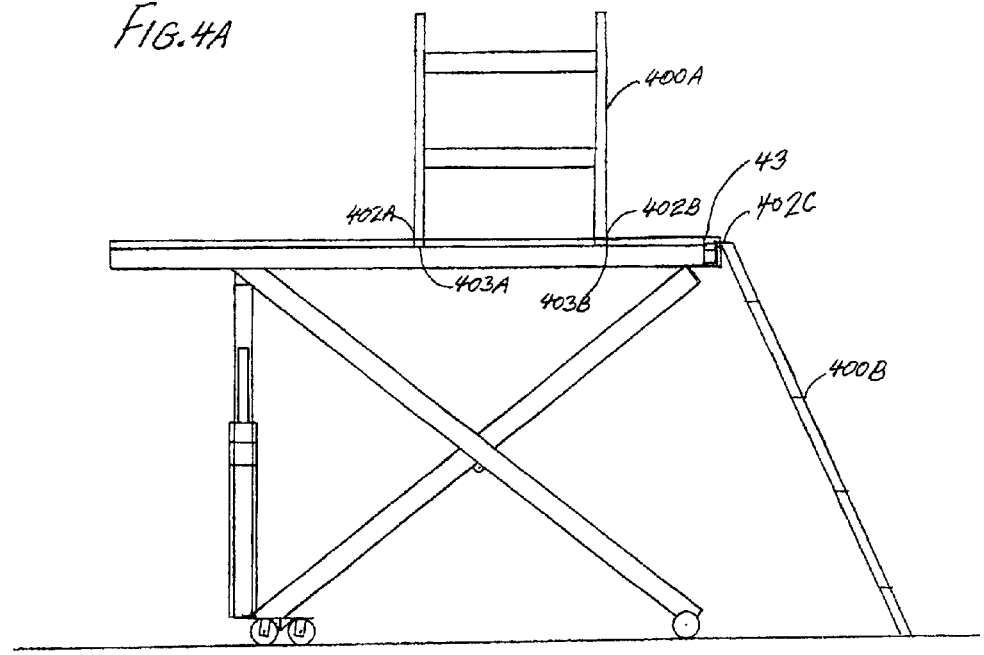
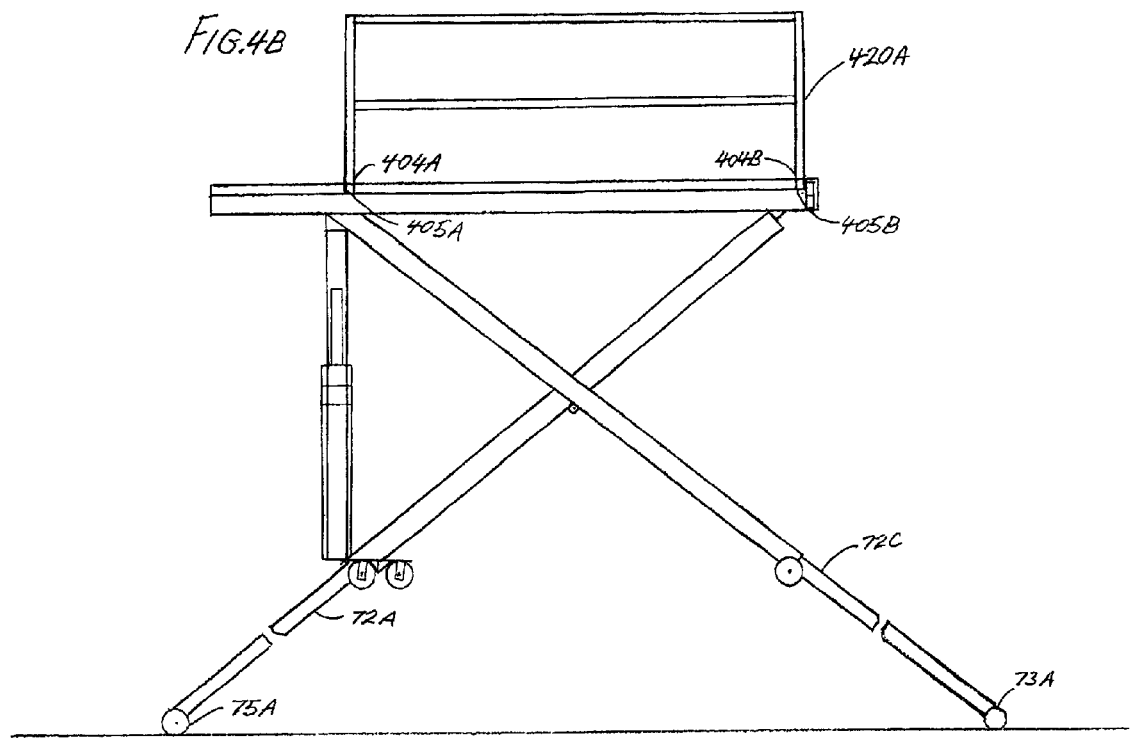

MULTIUSE LIFTING AND ROLLING PLATFORM

RELATED APPLICATION

Reference is made to my provisional application No. 60/228,577, filed Aug. 29, 2000 entitled "Combination Lifting and Cart".

FIELD OF THE INVENTION

This invention generally relates to a multi-use portable lift table. The portable lift table can be converted into a tilt-back hand truck, a scaffold, a floor jack or a mechanic's creeper.

BACKGROUND OF THE INVENTION

Various combinations of lifting and moving devices have been known in the past. U.S. Pat. No. 4,258,826 to Murray discloses a hand cart that can be converted to a step ladder and further discloses a winch that can raise a load to a higher level. U.S. Pat. No. 3,751,058 to Larsen discloses a combination snow shovel, wheelbarrow and dolly.

U.S. Pat. No. 6,173,811 to Tornabene et al. discloses a combination hand truck, stepladder and basket carrier.

U.S. Pat. No. 6,189,653 to Laug discloses a multi purpose scaffold.

U.S. Pat. No. 4,494,626 to Ast discloses a combination stepladder and hand truck apparatus.

U.S. Pat. No. 4,488,326 to Cherry discloses a pallet dock lift.

There is a need for a combination lift table, platform, tilt-back hand truck, work bucket, scaffold, floor jack and mechanic's creeper. None of the above patents describe the present invention.

OBJECT OF THE INVENTION

One object of the present invention is to provide a combination lift table, platform, tilt-back hand truck, work bucket, scaffold and mechanic's creeper apparatus which is readily convertible from a compact lift table structure into a rigid multipurpose tools structure. The apparatus is readily convertible from a lift table into a tilt-back hand truck, or readily convertible from a lift table to a scaffold or readily convertible from a scaffold to any of the above-mentioned configurations without the need to transfer a load during operation of the apparatus.

It is another object of the present invention to provide an apparatus that is simple and inexpensive to manufacture, as well as easy to operate and maintain.

Another objective is to provide an apparatus that can be used by consumers without special tools or training.

Another objective is to provide an apparatus that can be used to complete work from start to finish without the need to transfer a load from one device to another to avoid injury. The apparatus can be used to perform task that uses both the lift table configuration and a modified configuration to produce results superior to using separate devices to perform the tasks.

Another objective is to provide an apparatus that can be maneuvered by consumers without the use of a big vehicle to deliver a load because the lift table is compact and light weight, and requires only a small amount of storage space. This invention can help consumers and businesses save money which might otherwise be spent on the high cost of gasoline.

It is a further object of the present invention to provide a configuration where the load can rest on an extensible device and front scissor legs. When the lift table is elevated, the load will rest on scissor legs that provide different functions from previous inventions, as will be described later.

It is yet another object of the present invention to provide a new and novel combination lift table, tilt-back hand truck that can be elevated from the ground. By converting the apparatus and transferring the weight from the lift table to the configuration of the tilt-back hand truck, a load can be moved all the way inside a truck bed where a forklift is unable to reach.

It is still another object of the present invention to provide a pivotally attached support member that carries a load when used as a hand truck. The support plate can be moved upwardly and locked in place providing a compact structure for storage. The support plate can be suspended and lowered to the ground, docked and used as a platform.

An advantage of this invention is a lift assembly mechanism can be folded for compact storage and coupled to the rear portion of the lift table.

The lift table can be elevated to a desired height using the support plate that picks up the load from a truck or dock.

Another object of the present invention to provide a product lighter in weight that what is already known by using light weight swivel wheels which can be rotated and used as a stop. The scissor legs are made of steel or aluminum square tubing instead of heavy steel bars. Extended legs help the scissor legs when more strength is need for lifting heavier loads.

It is another object of the invention to provide multiple function attachments which can be coupled using the same coupling devices such as pockets, brackets and locking pins.

The invention has the advantage of making it easier for a user to carry and transport cargo when the apparatus is in the hand truck configuration.

The lift table configured as a mechanic's creeper is usable as a seat to support a worker, as an upright, or as a toolbox.

Another advantage is the lift table configured as a floor jack usable to load or unload automotive parts, large size tires and to raise a vehicle.

The lift table can be inclined for fast convenient loading and unloading with less effort.

The lift table uses a single lift drive for tilting, lifting and lowering with an additional hydraulic device or other drive/control device.

DRAWING FIGURES

FIG. 1C is a left end view of the lift table shown in FIG. 1A;

FIG. 1D is a left end view of the lift table shown in FIG. 1B;

FIG. 1E is a removed sectional view of the extensible device;

FIG. 1F is a side view of a manually operated hand crank lift assembly;

FIG. 1G is a side view of the hydraulic lift assembly;

FIG. 1H is a side view of the embodiment of FIG. 1G, showing the hydraulic lift assembly in a lowered position;

FIG. 1I is a top view of FIG. 1B in its elevated position;

FIG. 1J is an enlarged partial sectional view of the support plate, also a support plate channel taken along the line 1J—1J in FIG. 1I;

FIG. 1K is an enlarged partial sectional view of the support plate channel locking mechanism take along the line 1K—1K in FIG. 1I;

FIG. 1L is an enlarged partial sectional view of the support plate and support plate locking mechanism take along the line 1L—1L in FIG. 1I;

FIG. 1M is an enlarged partial section view of the support plate and support plate channel take along the line 1M—1M in FIG. 1I;

FIG. 1N is a partial exploded perspective view of a combination of extended legs and reinforce legs with wheel assembly;

FIG. 1O is a partial exploded perspective view of a combination extended legs and reinforce legs with a cross bar;

FIG. 1P is an enlarged partial view of the swivel wheels assembly taken along the line 1P—1P in FIG. 1I;

FIG. 1Q is a sectional view of the swivel wheels assembly taken along the line 1Q—1Q in FIG. 1P;

FIG. 1R is an enlarged partial section view of the pivot pin assembly taken along the lines 1R—1R in FIG. 1A;

FIG. 1S is a sectional view of the pivot pin assembly taken along the line 1S—1S in FIG. 1R;

FIG. 1T is a is an enlarged partial sectional view similar to FIG. 1M showing the support plate lowered to the floor level;

FIGS. 2C through 2F are side views of the lift table with an extensible device,

FIG. 3A is a side view of the lift table shown lowered to the floor level and lifting stackers;

FIG. 3B is a side view of the lift table in an elevated position;

FIG. 3C is a side view of the hand crank pusher wheel;

FIG. 3D is shown in the hand truck usage configuration or standard two wheeler;

FIG. 4A is a side view of the lift table in use as a stepladder;

FIG. 4B is a side view of the lift table in use as a scaffold;

SUMMARY OF INVENTION

The object of this present invention is to provide a combination lifting, platform, tilt back hand truck, scaffold, work bucket, floor jack, and mechanic' creeper. It is readily convertible from a lift table into a tilt back hand truck, or readily convertible from a lift table to a scaffold or readily convertible from a scaffold to any of the above mentioned functions without the need to transfer the load between operation.

The present invention provides a pocket, a bracket, extension legs, an extensible device and pin holes to couple a variety of different devices to achieve different function results. This product provides a function that uses both the lift table aspect and the modified or added on function aspect to provide results superior to using separate devices to perform the functions. When performing two or more functions the tilt back hand truck can deliver from the ground a load and raise the combination lifting platform to different levels such as a truck bed by converting and transferring weight from the lift table configuration with support plate or to the tilt back six wheeler configuration. The lift table can be converted to a hand truck two wheeler and continue to move the load all the way inside the truck bed. These tasks performed us modified lift table without the need to transfer the load from one device to another device. without additional hydraulic cylinders or other drive/control devices.

Description—FIGS. 1 to 6D

Figure 1A:
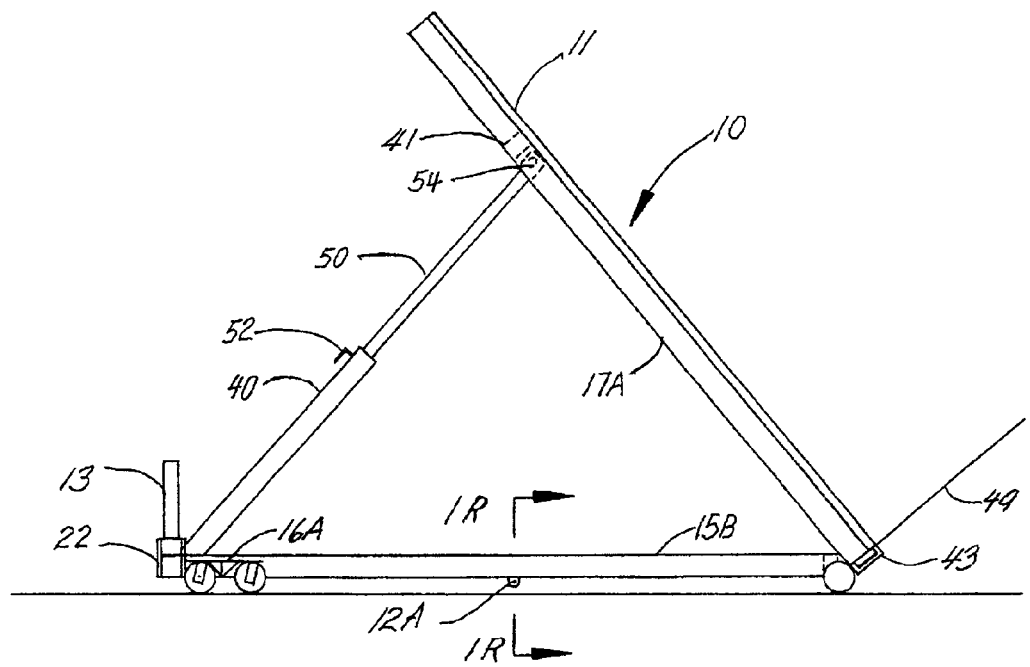
FIG. 1A is a side elevational view of the lift table in accordance with this invention. It is shown in a lowered transport condition with an extensible device attached to the lower cross bar and platform.
Figure 1B:
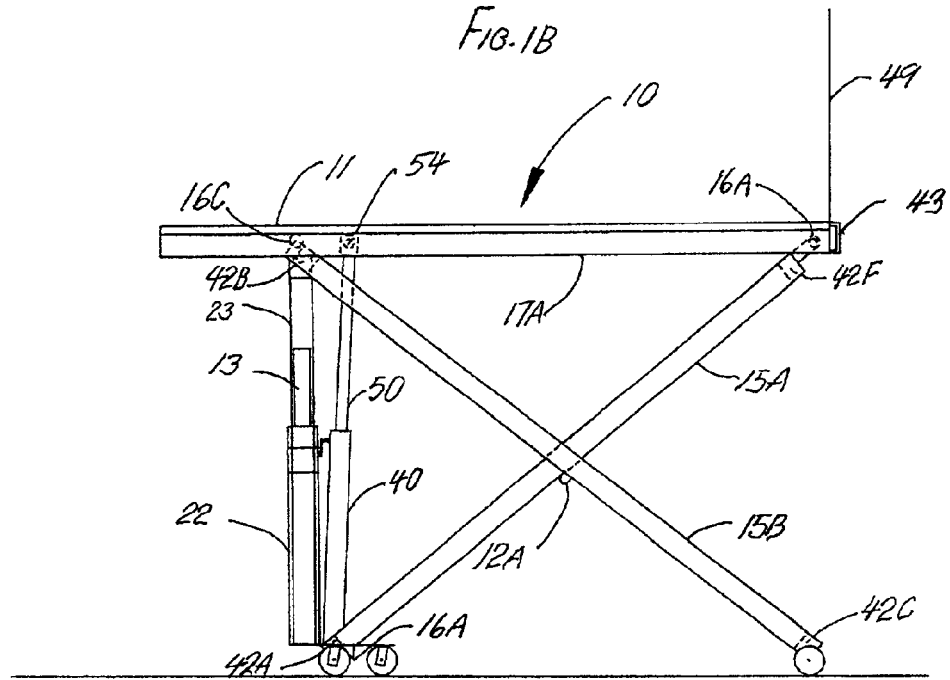
FIG. 1B is a side elevational view of the lift table in an elevated position.

FIGS. 1B and 1D. depicts a scissors-type hydraulic-driven or screw thread-driven, lift table 10. Two pairs of scissor legs 15a, 15b, 15c, 15d, made of steel or aluminium tubing are mounted at a first end, e.g., using pivot pins 16a, 16b, (between the cross bar 42d) at both sides of platform cross frame 17a, 17b, and pivotally attached to both front wheels 18a, 18b, (between the cross bar 42c) at a lower portion of the scissor legs. The upper support frames include the platform cross frame 17a, 17b, and deck 11. The opposite ends of the scissor legs are coupled to both rollers 16c, 16d and to swivel wheels 18c, 18d. The first pair of scissor legs 15a, 15b are pivotally coupled, defining a scissor pivot pin 12a (pivot axis) and the second pair of scissor legs 15c, 15d are pivotally coupled at the same axis at pin 12b. A drive or motive device such as a hand operated hydraulic pump or other control may be provided for extending or retracting the hydraulic cylinder 13 and cylinder rod 14. Other drive or motive devices are screw thread-driven which may be hand cranked, powered by electric hand drill or powered by electricity or air. Energy for a screw thread-driven device may be provided from an on-board battery and/or from electric power via a cable (not shown). Optionally, a switch or other control may be provided such as remote control (not shown).

In the depicted embodiment, the hydraulic cylinder 13 is pivotally coupled at one end to pivot pin 29 and lift arm 23, extending between the ball joint 26 and cross bar bracket 34d. The ball joint 26 and cross bar bracket 34d are mounted at the center of cross bar 42b and connected to the scissor legs15a,15d and pivot pin 25 (pivot axis) via cross bar brackets 39d. The ball joint 24 and cross bar bracket 34c are mounted at the center of lower cross bar 42a and connected to the scissor legs 15b, 15c and pivot pin 25 (pivot axis) via lower cross bar 43a. When the hydraulic cylinder 13, cylinder rod 14 and support rod 27 are extended they cause lift arm 22 and lift arm 23 to spread apart pushing the cross bar 42b and deck 11 upward as in FIGS. 1B, 1D and 1G. When the hydraulic cylinder 13 is retracted it causes the lift arm 23 to lower the rear deck cross bar 41 and the platform assembly. This is best seen in FIGS. 1H and 3A.

In the depicted embodiments of FIGS. 1A and 1B the rear deck cross bar 41 is attached to bracket 55a, 55b by welding and the bracket 55a is pivotally attached at one end to a extensible rod 50 and to the extensible device 40 by locking pin 54 inserted in holes 200a 200b 200c 200d. The extensible device 40 is rested on bracket 51 and attached by locking pin 53a to cross bar 42a, adjacent the lower end of scissor legs 15b, 15c (FIG. 1E). When the hydraulic cylinder 13 retract, causing the front cross bar 42*d*, support plate channel 43 and pivot pins 16*a*, 16*b* (FIG. 1A) mounted to the upper end of scissor legs 15*b*, 15*c* to tilt and lower as best seen in FIG. 1A to a tilt-back-six wheeler position. Also, when elevated, the lift table 10 provides lifting and tilting when lowered, the lift table 10 provides tilting and lowering of the lift table 10. The lift table 10 can be used for a number of functions, such as a tilt back hand truck, as a inclined lift table 10, as a portable loading dock and also used as a transporting cart. The device can be used to load and unload boxes, plywood, glass, table and office partitions and can be pushed by hand. The handrails 420*a*, 420*b* may be used for securing the load from falling as best seen in FIG. 4B. For unloading the load from lift table 10 to a van or truck, adjust the extensible rod 50 a little higher than the van or truck. To provide an incline for deck 11, release the securing deck pin 221 attached to bracket 220 or welded to crossbar 42*b*, then unlock the support plate channel lock 61 and kick the support plate 49 to a lowered position so that it rests on the van bed and moves the load over the approach ramp from deck 11 to the van. When unloading from a van to lift table 10, adjust extending leg 72*a*, 72*b*, (FIG. 1N) higher than rear deck 11 to provide an incline, then rest the support plate 49 on the van bed or truck bed. Then move the load to lift table 10 and lower it to convert to a tilt-back position. Then lift crossbar 42*a* or step on support plate 49 and convert the lift table to a hand truck position as shown in FIG. 3D. Then move the load off the support plate 49. The extensible device 40 can be folded-in with extensible rod 50. Micro adjust-stop pin 52 permits adjustment to a precise height or angle. Converting from a tilt-back position to a platform position (FIG. A1), provides an incline to quickly roll loads on and off. The lift table can also used as a hand crank wheel pusher 48 (FIG. 3A), (FIG. 3C) or electric wheel pusher (not shown).

In the embodiment of FIG. 1F, showing the screw thread-driven lift assembly. The ball joint 38*b* is welded to the left portion of the lift arm 32*a*. The right side of the lift arm 32*a* is attached to the folding support arm 33 which is attached to holes using a bolt and nut 130*a*, 130*b* on both sides, which are also attached to the stop pin 36*a*, 36*b*, in the slot 37*a*, 37*b*, permit movement of the support arm 33, which is restrained by stop pin 36. The lift arm 32*a* is pivotally attached to the right side of lift arm 32*b* by a bolt and nut 34*a*, 34*b*, (pivot axis) and the left side of lift arm 32*b* is welded to ball joint 38*a*. A nut 121 is welded to the upper center of bracket 122 and pivotally attached to top edge of both sides of lift arm 32*b* using a bolt and nut 123*a*, 123*b*, 124*a*, 124*b* as shown in FIG. 6D. A threaded shaft 39 is attached between nut 121 and the hand crank gear assembly. When cranked, 125*a* is rotated, which causes lift arm 32*a* 32*b* to spread apart and raise the lift table 10, or when drawn together, causes the lift table to lower. The hand crank assembly, including gear bracket 126, is provided with coupling hole 131. Threaded shaft 39 is welded to gear 129*a*, at holes 127*a*, 127*b* provided for shaft 125*b*, which is welded to gear 129*b*. The hand crank 125*a* is coupled to shaft 125*b* and joint 125*c*. The gear bracket 126 is attached between the top edge of the folding support arm 33 by nuts and bolts 134*a*, 134*b*, 134*d*, 134*f*.

In the embodiment of FIG. 1I, the construction of the lift table 10 includes a flat loading surface, or deck 11, and may be made from wood, steel, or fibreglass (with or without a rough surface). The deck 11 is supported by a plurality of cross bars 17, 41, 19*a*, 19*b*, 19*c* and a support plate channel 43 with longitudinal platform cross frames 17*a*, 17*b* and brackets 55*a*, 55*b* provided with select holes 200*a*, 200*b*, 200*c*, 200*d*, located between cross bar 19*a* and rear deck cross bar 41. The platform is secured by pin 221 and bracket 220 which is welded on rear deck cross bar 42*b* near the upper portion of scissor leg 15*a*. Deck 11 has pockets 403*a*, 403*b*, 403*c*, 403*d* for stepladder 400*a* and pockets 405*a*, 405*b*, 405*c*, 405*d*, for rails 420*a*, 420*b*. There are holes 601*a*, 601*b*, for head rest 600 and pockets 403*a*, 403*b*, that can also be used for work bucket 500.

Lift table 10 includes a pivoted combination support plate 49 shown in FIGS. 1J, 1K, 1L, 1M and 1T. Support plate 49 can be removed from the support plate channel 43 by pressing on support plate channel lock 61 which is mounted to support plate channel 43 by bolt 60 causing the spring 68 to collapse to remove the support plate 49. On a first and second end, the support plate 49 includes support plate rod holders 63*a*, 63*b*, which are attached by clamps 64*a*, 64*b*, that are welded to support plate 49. Steps 66*a*, 66*b*, are welded to support plate 49, and spring 65*a*, 65*b*, are positioned between rod holders 63*a*, 63*b*, and stops 66*a*, 66*b*. To remove support plate 49 completely from support channel 43, rod holders 63*a*, 63*b*, are engaged as shown in FIG. 1J. The support plate 49 can be swung upwardly when the lift table 10 is being transported or stored. The support plate 49 can be lowered, for engagement with the floor, dock, or approach ramp FIGS. 1T and 3A. The lift table 10 can be suspended in its lowered position by engagement with a stop 70, by a shoulder welded to support plate 49 in FIGS. 1T and 3A. The support plate 49 can be raised to the elevated position, and locked to support plate channel 43 as seen in FIG. 1B. The lift table can be used as a standard hand truck, two-wheeler or tilt-back six-wheeler when support plate 49 is locked to channel 43 as shown in FIGS. 1A, 1L, and 1M. The support plate 49 is available in different sizes.

In the embodiments depicted in FIGS. 1N and 1O, combination extend legs are provided for coupling to lift table 10 by extending legs 72*a*, 72*b*, 72*c*, 72*d*, by insertion of the extending legs 72*a*, 72*b*, 72*c*, 72*d* in the lower end of the scissor legs 15*a*, 15*b*, 15*c*, 15*d*, respectively. The lower end of the scissor legs are also included with an adjust-stop pin 81*a*, 81*b*, 81*c*, 81*d*. For adjusting the height of extending legs 72*a*, 72*b*, 72*c*, 72*d*, holes 80*a*, 80*b*, 80*c*, 80*d*, 80*e*, 80*f*, 80*g*, are provided on each of the extending legs.

In FIGS. 1N and 1O, cross bar 73*a*, is coupled by welding to the wheel member 75*a*, 75*b*, to support the shaft mounted to wheel members 75*a*, 75*b*, (Only the cross bar 73*a* is equipped with wheels). Cross bar pockets 74*a*, 74*b*, 74*c*, 74*d* are coupled by welding the top of cross bar 73*a*, 73*b*. Cross bar pockets 74*a*, 74*b*, 74*c*, 74*d* are included with locking pins 77*a*, 77*b*, 77*c*, 77*b*. They are inserted into extending legs 72*a*, 72*b*, 72*c*, 72*d*, to connect extending legs 72*a*, 72*b*, 72*c*, 72*d*, to cross bar pockets 74*a*, 74*b*, 74*c*, 74*d*, via seated holes 79*a*, 79*b*, 79*c*, 79*d*, onto the locked cross bar 73*a*, 73*b*. The extending legs 72*c*, 72*d* and cross bar 73*b*, when attached together, can be used as a stop. They help to prevent lift table 10 from rolling away. They can be extended to elevate one end of the lift table 10 to provide an incline roller for fast loading or unloading and for reinforcing tubular legs. The extend legs 72*a*, 72*b*, 72*c*, 72*d*, and crossbar 73*a*, 73*b*, can be removed inserted or extended when the lift table 10 is in the lower position.

In the embodiments depicted in FIGS. 1P and 1Q, the swivel wheel assemblies 16*a*, 16*b*, are located on both sides of lift table 10. They includes brackets 90*a*, 90*b*, 91*a*, 91*b*, and hubs 86*a*, 86*b*. They are welded together as shown, with shafts 85*a*, 85*b*, then welded to the lower end of scissor legs 15*b*, 15*c*, and attached to hubs 86*a*, 86*b*. The swivel wheels 84*a*, 84*b*, 84*c*, 84*d* are mounted to brackets 90*a*, 90*b*, using nuts 88a, 88b, 88c, 88d, and bolts 87a, 87b, 87c, 87d. (The swivel wheels help cut down on weight instead of using the lower frame with the wheel assemblies) Wheels may be made of rubber or steel. The swivel wheel assemblies 16a, 16b can be rotated 180 degrees to provide a stop, preventing the lift table 10 from rolling away.

In the embodiments depicted in FIGS. 1R and 1S, a pair of pivot pins 12a, 12b, (12b shown in FIG. 1C) are at the center of hinges 102a, 102b. The hinges 102a, 102b are welded to the lower portion of scissor legs 15a, 15d. The pivot pins 12a, 12b are connected to the lower portion of the scissor legs 15b, 15c, bolt by nuts 104a, 104b, causing the pivot axis to be at a lower portion of the scissor legs. This configuration provides a space for extending legs 72a, 72b, 72c, 72d, making it possible to insert into a square tube to help reinforced the scissor legs 15a, 15b, 15c, 15d.

Figure 2A:
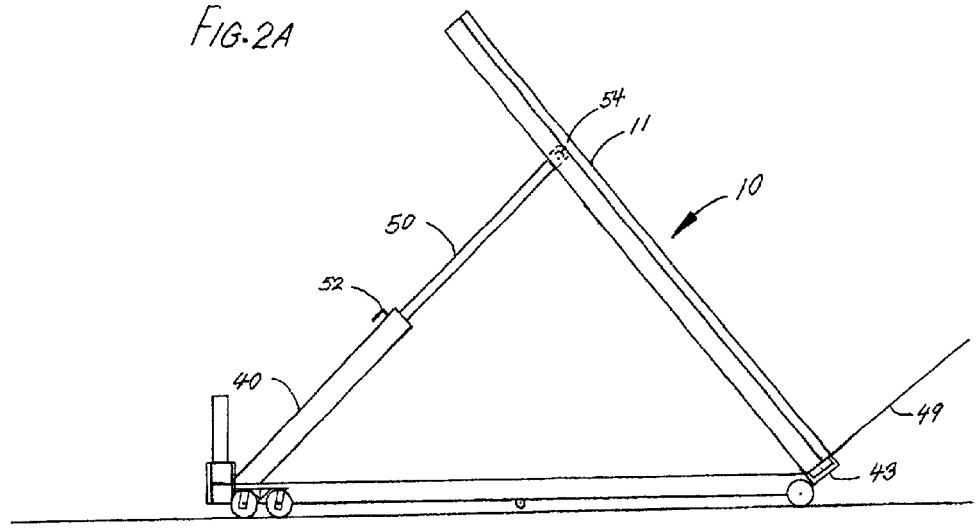
FIG. 2A is a side view of the lift table in accordance with the invention is shown in a lowered, transport condition with a removable extensible device attached to an upper cross bar and platform cross frame.
Figure 2B:
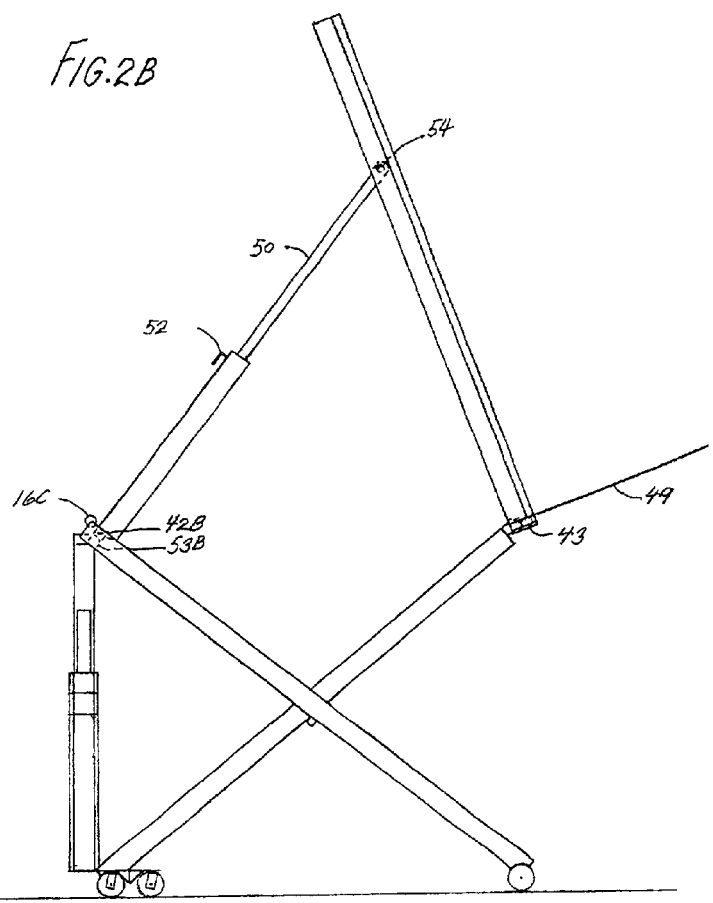
FIG. 2B is a side elevtional view of the lift table in an elevated position.

In the embodiments depicted in FIGS. 2A and 2B, the rear deck cross bar 41 is mounted with brackets 55a, 55b and locking pin 54. The deck is extended to pivot at one end of the extensible rod 50. The extensible device 40 (FIG. 1E) rests on bracket 51b, locking pin 53b and cross bar 42b. The upper end of the scissor legs 15a, 15d, (FIG. 1A) and the extensible device 40 rested on cross bar (42a). When the lift table 10 is raised, the angle of support plate 49 and deck 11 is rotated forward and upward as defined by the angle of extensible device 40. By selecting holes 200a, 200b, 200d, 200d, on brackets 55a, 55b (200d tilts or declines more than 200a), the extensible device 40 can be adjusted relative to adjust-stop pin 52 to extend the extensible rod 50 to use lift table 10 as a tilter device or incline device.

In the embodiments of FIGS. 2C, 2D, 2E, 2F, the side view of the tilt-back six wheeler configuration, two wheeler hand truck configuration and the elevation of the lift table 10 is shown. The lift table 10 can be used to load and unload box 201 from the truck bed 200.

FIG. 2C. shows the lift table 10 lifting and transporting box 201, from a truck bed 200. FIG. 2D. It shows the device transformed from a tilt-back six-wheeler position to a two-wheeler position which also can transferred the weight box 201 to the truck bed 200. The safety lock 202 is pivotally attached to the truck bed. Using safety lock 202 to attach the support plate 49, prevents the support plate 49 from sliding away or tilting. Then rotate hand truck around safety lock 202 between loading platform or dock to truck rear end loading platform. FIG. 2E, shows the lift table 10 extended with scissor legs and wheel assemblies 16a, 16b, 18a, 18b. It also transforms lift table 10 back to tilt-back position. It will rest on the support surface, releasing safety lock 202, then stepped on to the cross bar 42a. On heavier loads it prevents lift table 10 from the tilting use of the extending legs 72a, 72b. With the cross bar 73a move forward can pass the center gravity of the load and move the lift table 10 away from the truck bed 200. Then lowering the lift table 10 to a tilted back position, the lift table 10 secured in the desired angle. FIG. 2F shows the lift table 10 is lowered in transporting. To load box 201 and lift table 10 on the truck 200, reverse the procedure (2F, 2E, 2D, 2C,). The support plate safety lock being selected from the group consisting of a vise grip lock, a foot control lock, a remote control lock, a wire pulling lock and an automatic self lock.

In the embodiment depicted in FIG. 3A, lift table 10 is shown lowered to floor level. The support plate 49 is removed from the support plate channel 43 and lowered, for engagement with the floor, as seen in FIG. 1T. The extensible device 40 is attached to the hand crank pusher wheel. In FIG. 3C, the locking pin 303 is mounted to bracket 44, in such a manner that cranking the extensible device 40 causes the lift table 10 and support plate 49 to move forward in relation to the floor. The lift table can then lift many stacks of boxes 301 in one pass. In the embodiment of FIG. 3B, the lift table 10, is in an elevated position, to tilt and unload boxes 301 near to a truck or van, an elevated loading dock, tilting table or loading pallet without a fork device. It is can be raised at an angle similar to FIGS. 6A, 6B.

In the embodiments depicted in FIGS. 3A and 3C, the hand crank pusher wheel is comprised of a wheel 310 welded to one side of the center gear 309 and attached to the wheel support 320 by the locking pin 303. The upper portion of the wheel support 320, is provided with a pocket 316 hole and a locking pin 321 attached to extensible device 40. A pair of springs 318a, 318b, are hooked to the lower edge of the select lever 314 by hole 319. The opposite end is hooked to a one way push mechanism 340. Both ends are hooked to holes 317a, 317b. The wheel support 320 is provided with a pivot pin 313 that attaches a one way mechanism 340 and a pivot pin 315 that attaches the select lever 314. Pushing the select lever 314 to the left will cause the spring 318a to pull the one way mechanism 340 to pivot and upon release of lever 314, lower to the right side and lock on center gear 309 in such a manner, that cranking extensible device 40 to the left causes wheel 310 to rotate clockwise so as to reverse push select lever 314 to the right side and crank extensible device 40 to right. It can be set up to operate and lift at an angle similar to FIGS. 6A, 6B.

The embodiment depicted in FIG. 3D shows the hand truck usage condition or standard two wheeler. The support plate 49 is locked in support plate channel 43. This achieves a minimum width thereof between the rearward surfaces of the wheel member 18a, 18b which can be stored in a minimum amount of space. The hand truck can be stored in a car trunk or used inside a home and transformed to a step ladder FIG. 4A or a scaffold FIGS. 4B, 2A and 2B.

In the embodiments depicted in FIGS. 4A and 4b, lift table 10 is used as a scaffold and stepladder. Stepladder 400a, is coupled to lift table 10 by coupling ends 402a, 402b by insertion to the upper deck pockets 403a, 403b, 403c, 403d. The stepladder 400b is coupled to lift table 10 by coupling end 402c, as seen in FIG. 1I and 1T. Coupling end 402c is inserted in support plate channel 43, and rotated 180 degrees, to operate as floor stop, set to prevent a roll away. The ladders 400a, 400b can be stored below the deck 11 FIG. 4B. The lift table 10 is used as a scaffold that positions extending legs 72a, 72b, 72c, 72d. Inserted into scissor legs 15a, 15b, 15c, 15d and cross bar 73a, 73b, the extending legs are attached to the lift table 10 as shown in (FIGS. 1N, 1O,). A pair of hand rails 420a, 420b are coupled to the lift table 10 by coupling ends 404a, 404b, 404d, 404e, and inserted in pockets 405a, 405b, 405c, 405d respectively as shown in 1I.

The device can be used to perform a number of functions, such as a portable loading dock, overhead maintenance repair, lifting loads, tools, and lumber. The operator may stand on the deck and ride it up to the proper elevation, while under the control of an assistant or while under the control of the operator as he rides (a remote control device not shown). The deck can be tilted parallel to the ceiling, roof, pole or work piece for more convenient repair. Another possible use is the telescopic supports that ensure adaptation to any standing surface contour. Extensible and retractable climb-through apertures at the end of the deck 11 permit safe access to the scaffold movement surface.

Figure 5A:
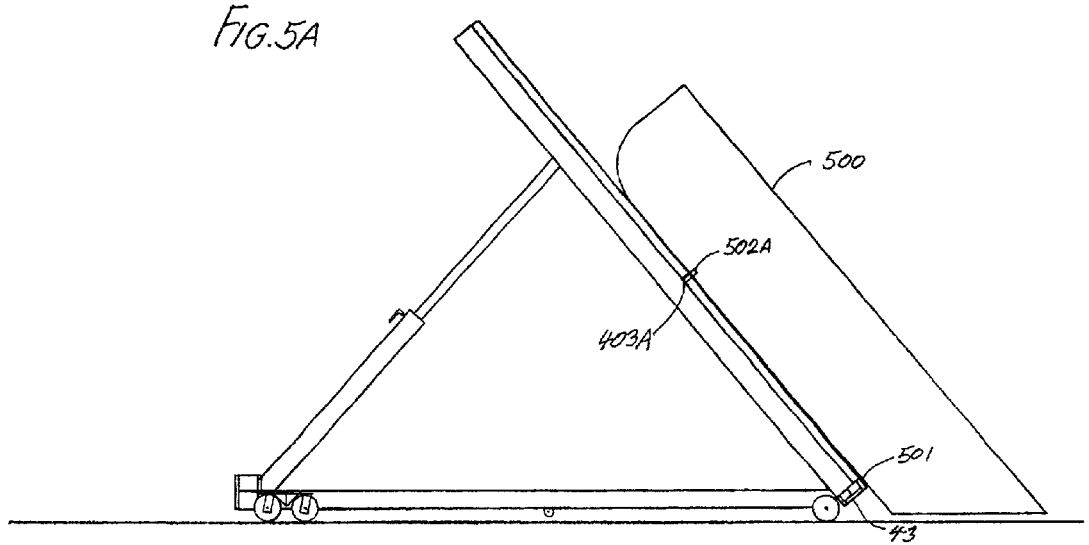
FIGS. 5A and 5B are views of the lift table in use as a work bucket.
Figure 5B:
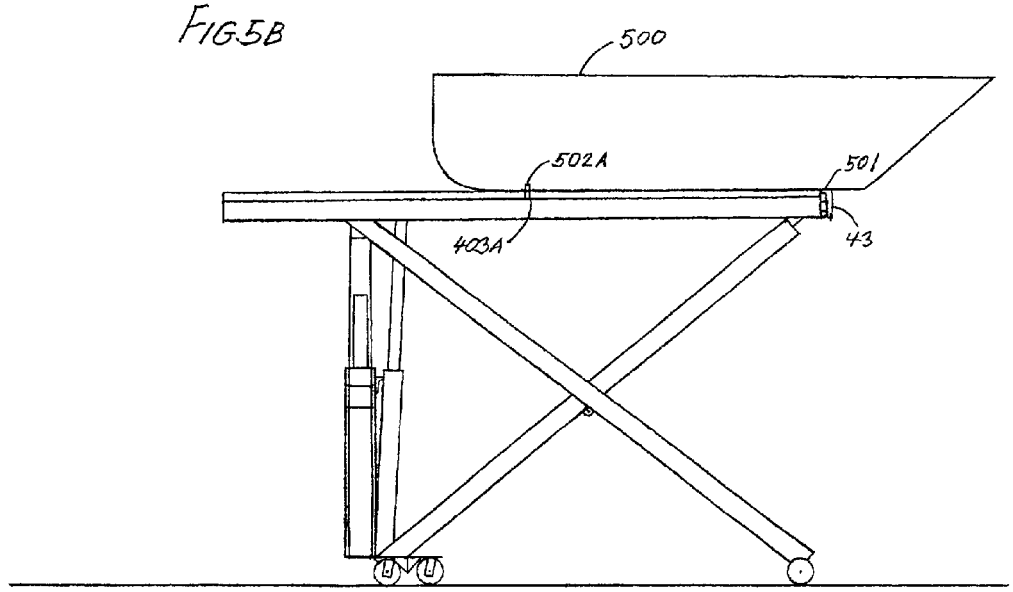

In the embodiments depicted in FIGS. 5A, and 5B, a work bucket 500 is coupled to lift table 10 by coupling brackets 502a, 502b. They are welded to both sides of the work bucket, inserted in the upper deck pockets 403a, 403c and bolted by 503a, 503b. The front edge of work bucket 500 is welded to bracket 501 (FIGS. 1K and 1L) and inserted into support plate channel 43, and locked by support plate channel lock 61. It can be operated to function similarly to FIGS. 2A and 2B. FIG. 5B can be elevated, loaded or unloaded onto a truck bed. The work bucket allows you to lower a load to the floor level, It is designed to position containers, with a part, within fingertip reach of the assembly line. Workers and machine operators can eliminate the bending and stretching that is required to remove components from deep baskets and boxes.

Figure 6A:
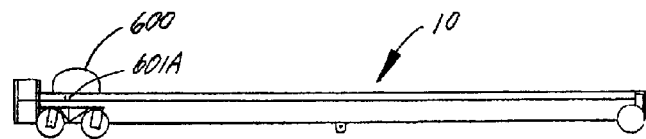
FIGS. 6A and 6B are side views of the lift table in use as a mechanic's creeper.
Figure 6B:
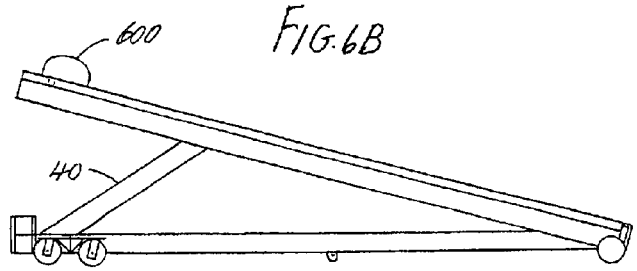

In the embodiments depicted in FIGS. 6A and 6B the lift table 10 is lowered to the floor level. The extensible device 40 is attached to the platform frame and upper cross bar 42b. The head rest 600 is coupled to deck 11 by coupling pins with holes 601a, 601b inserted in to the upper deck. The mechanic's creeper works as a seat support. A worker can set the tool box at the same time, and elevate the tool box at a desired level for the working condition. It is convenient with a remote control and useful for a business or at home. It can be inclined or raised at an angle to support the worker when working in a face down position or used for hard to reach places. It's easy to adjust it higher when you work.

Figure 6C:
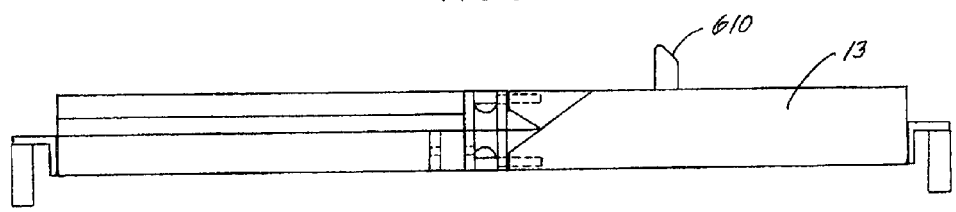
FIGS. 6C and 6D are a side view and a top view of the lift table in use as a floor jack.
Figure 6D:
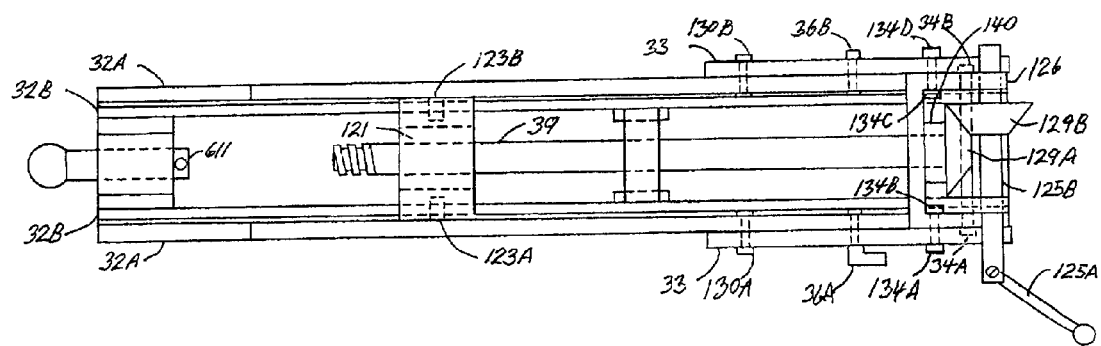

In the embodiments of FIGS. 6C and 6D the lift table 10 is used as a floor jack. FIG. 6C shows the lift table 10 lowered to the floor level. The extension 610 is inserted between the lift arm 32b or lift arm 23 in FIG. 1G and uses a top portion of extension 610 to elevate and lift the frame of a vehicle. A floor jack can be remove the lift arm assembly from cross bar bracket 34c, 34d by removing pin 611 from the ball joint 24, 26, 38a, 38b. A floor jack is typically employed for automotive repair work and can load and unload automotive parts, spare tires, as wells as raise and angularly align a transmission with an engine. A floor jack can perform two functions by using extension 610 to lift the vehicle with a load on deck at the same time. Also, it is portable, foldable, and light weight and can fit in a car or trunk.

What is claimed is:

1. A multiuse platform comprising: a wheeled support assembly having a lower crossbar, a first and a second pair of scissor legs having ends; said first pair of scissor legs connected to said lower crossbar;

a platform frame assembly positioned above said wheeled support assembly, said platform frame assembly having a pivoted end, said second pair of scissor legs mounted to said pivoted end, said platform frame assembly lying on top of an upper cross bar of said first and second pair of scissor legs and each of said pair of scissor legs being pivoted together intermediate their ends, so that said platform frame assembly is movable upwardly and downwardly in relation to said wheeled support assembly;

a lift structure connected to said lower cross bar on said wheeled assembly and to said upper cross bar for lifting said platform frame assembly with respect to said wheeled assembly, said lift structure comprising an upper arm and a lower arm, said upper arm being pivotally connected to said upper cross bar and said lower arm being pivotally connected to said lower cross bar, said upper and lower arms being pivoted together;

a lift drive structure connected to said lift structure for raising said platform frame assembly to a desired elevation, said lift drive structure being selected from a group consisting of: a screw thread jack, a telescoping support, a hydraulic cylinder, a hydraulic actuator and a screw actuator;

an extensible structure different from said lift structure having a first end pivotally mounted to said rear end of said platform frame assembly and said second end pivotally mounted into at least one of said upper cross bar and said lower cross bar;

a platform having first and second ends and having said first end connected to said extensible structure and said second end pivotally attached to said platform frame assembly to permit angular raising of said first end of said platform with respect to said platform frame assembly; said platform having a locking assembly, said locking assembly releasably locking said platform to said platform frame assembly;

said platform frame assembly having one end connected to a support plate by a support plate channel, a support plate locking assembly releasably connecting said support plate to permit releasable locking of said support plate to said platform frame assembly;

said support plate locking assembly being different from said platform frame locking assembly and being pivotally connected to a first and a second rear end of said support plate;

said platform having lower crossbar brackets and said first pair of scissor legs being mounted in a detachable manner, by an attached pusher wheel, at least one pocket, and a self locking support plate channel locking structure, used to modify the configuration of the multiuse platform to perform as a stepladder and scaffold, a work bucket, a floor jack and a mechanic creeper.

2. The multiuse platform of claim 1 wherein said platform frame assembly can be simultaneously vertically and angularly raised.

3. The multiuse platform of claim 1 wherein said lift structure includes a single lift drive structure which is pivotally connected to said upper and lower arms so that said upper and lower arms can be folded together for compact storage.

4. The multiuse platform of claim 1 wherein said upper and lower arms are pivotally coupled together at one end and the other end of said upper arm is pivotally connected to said upper cross bar by a ball joint assembly and said lower arm is pivotally connected to said lower cross bar with a ball joint assembly.

5. The multiuse platform of claim 1 wherein said support plate locking assembly includes a bolt, a spring, a lock, and said support plate channel.

6. The multiuse platform of claim 1 wherein a support plate safety lock is pivotally mounted to an adjacent loading surface rear end.

7. The multiuse platform of claim 1 wherein said extensible structure includes first and second members telescopically mounted and movable into a selected one of a plurality of positions adjusting the length, and releasably lockable in one of said plurality of positions.

8. The multiuse platform of claim 1 wherein there is a first and second pair of extendable reinforced legs associated with a lower end of each of said first and second pair of scissor legs so that said extendable reinforced legs, respectively on said first and second pairs of scissor legs, can be moved away from pivots connected between said scissor legs.

9. The multiuse platform of claim 1 wherein said pusher wheel is pivotally and removably connected to said lower cross bar bracket when said platform and said support plate are in a position lower to floor level to facilitate sliding of said support plate below a load.

10. The multiuse platform of claim 1 wherein said stepladder and scaffold include a removable rail attached within a support pocket in said platform to act as an anti-falling device.

11. The multiuse platform of claim 1 wherein said extendable reinforced legs are inserted into at least one of said first or second pair of scissor legs to shift the center of gravity of a load to prevent the platform from rolling over and tilting.

12. The multiuse platform of claim 1 wherein said first or second pair of scissor legs are tubular and said first pair and second pair of scissor legs being pivoted together outside of the tube of said tubular legs on pivot pins so that said extendable reinforced legs are slideable into said tubular legs to reinforce said tubular legs.

13. The multiuse platform of claim 1 wherein a first and a second pair of extendable reinforced legs is associated with a lower end of each of said first and second pair of scissor legs so that said extendable reinforced legs and cross bar are removable to reduce the weight of the platform.

14. The multiuse platform of claim 1 wherein said extendable reinforced legs are releasably lockable to the wheel support assembly and lower cross bar.

15. The multiuse platform of claim 1 wherein said work bucket is configured to load and unload and is configured for high elevation tilting and dumping.

16. The multiuse platform of claim 1 wherein said extensible structure has an upper end pivotally mounted to said upper cross bar and a lower end pivotally connected to said upper cross bar and said second pair of scissor legs so that said platform can be raised at an angle for use as a mechanic creeper.

17. The multiuse platform of claim 1 wherein said extensible structure has an upper end pivotally mounted to the upper cross bar and a lower end is pivotally mounted to said upper cross bar and said second pair of scissor legs so that said platform can be configured for use as a floor jack to load parts at an angle by raising said platform.

18. The multiuse platform of claim 1 wherein said support plate safety lock assembly is selected from a group consisting of a foot control lock, a remote control, a vise grip lock, a wire pulling lock and an automatic self locking mechanism.

19. The multiuse platform of claim 5 wherein said support plate channel is on the pivoted end of said platform frame assembly to lock said support plate in a position at an angle in relation to said platform frame assembly when said support plate is in a hand truck usage position.

20. The multiuse platform of claim 5 wherein said support plate locking assembly includes a spring, a stop, a slot and rod holder attached between a first and second end of said support plate so that said support plate is pivotally mounted on said platform frame assembly to swing from a position where the support plate lies on top of said platform frame locking assembly to a position extending downward to hang from the end of said platform frame assembly; rods positioned between said support plate and said platform frame assembly locking said support plate with respect to said platform frame assembly at selected angular positions so that said platform frame defines a retractable support plate approach ramp system for joining said platform to an adjacent loading surface.

21. The multiuse platform of claim 5 wherein said spring can be compressed to release said support plate locking assembly to release said support plate from said platform frame locking assembly.

22. The multiuse platform of claim 6 wherein said extensible structure is connected to said upper cross bar and to said platform frame assembly when said platform is in a hand truck usage position; said support plate being locked by said support plate safety lock to said adjacent loading surface and when said platform is lowered, said platform is folded by pivoting about top ends of said first pair of scissor legs to raise a load and the platform to said adjacent loading surface.

23. The multiuse platform of claim 7 wherein said platform frame assembly cross bar bracket permits adjustment of the platform frame assembly to a plurality of positions adjusting the angle of the platform frame assembly.

24. The multiuse platform of claim 7 wherein said extensible structure has an upper end pivotally mounted onto said platform frame cross bar and a lower end pivotally connected to said lower cross bar so that said platform can be raised to an angular lift table position and lowered to a hand truck usage position.

25. The multiuse platform of claim 7 wherein said extensible structure is removable from said upper and lower cross bars and said extensible structure is releasably lockable into a selected one of a plurality of positions adjusting the angle of said platform.

26. The multiuse platform of claim 7 wherein said extensible structure is pivotally attached to said upper cross bar by means of a removable stop pin through a bracket hold in said upper cross bar so that said extensible structure can support said upper cross bar or rotate to a folded position below said platform for use as a hand truck.

27. The multiuse platform of claim 8 further including a lock structure on said first and second pair of scissor legs so that said first and second pair of extendable reinforced legs can be releasably locked to said first and second pair of scissor legs.

28. The multiuse platform of claim 10 wherein said stepladder is removably connected to said pocket in said platform and a support plate channel in said platform for selective use for performing work at a high elevation and for raising a load.

29. The multiuse platform of claim 28 wherein said platform and said scaffold can be utilized for high elevation tilting.

* * * * *